May 27, 1930.  C. TAYLOR  1,760,217
ICE CREAM FREEZING SYSTEM
Filed Nov. 1, 1926  5 Sheets-Sheet 1
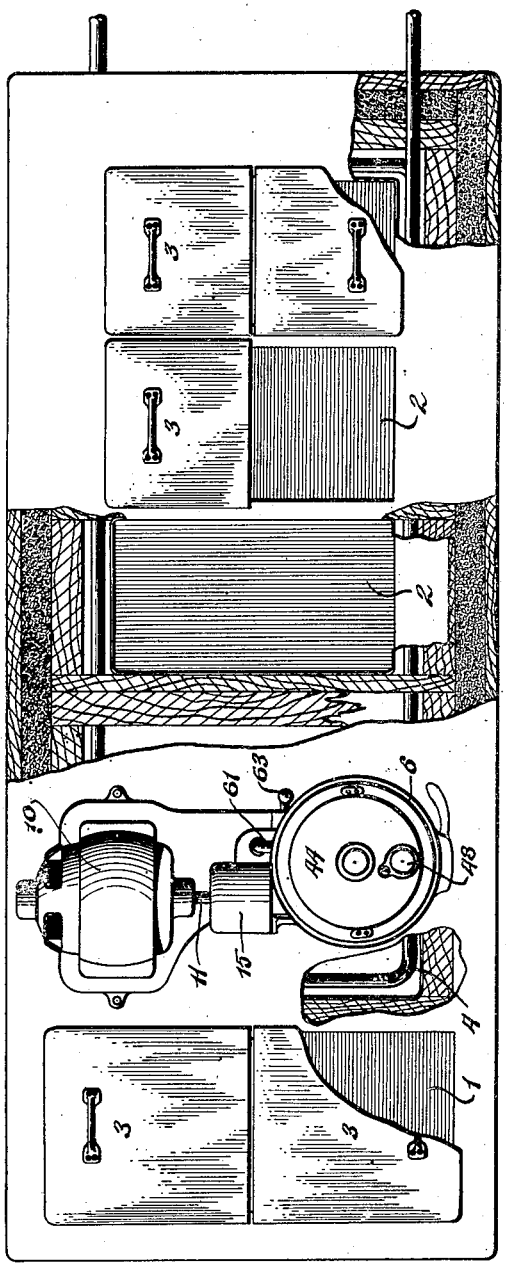
Inventor
Charles Taylor
By Pope and Powers
Attorney May 27, 1930.  C. TAYLOR  1,760,217
ICE CREAM FREEZING SYSTEM
Filed Nov. 1, 1926  5 Sheets-Sheet 2
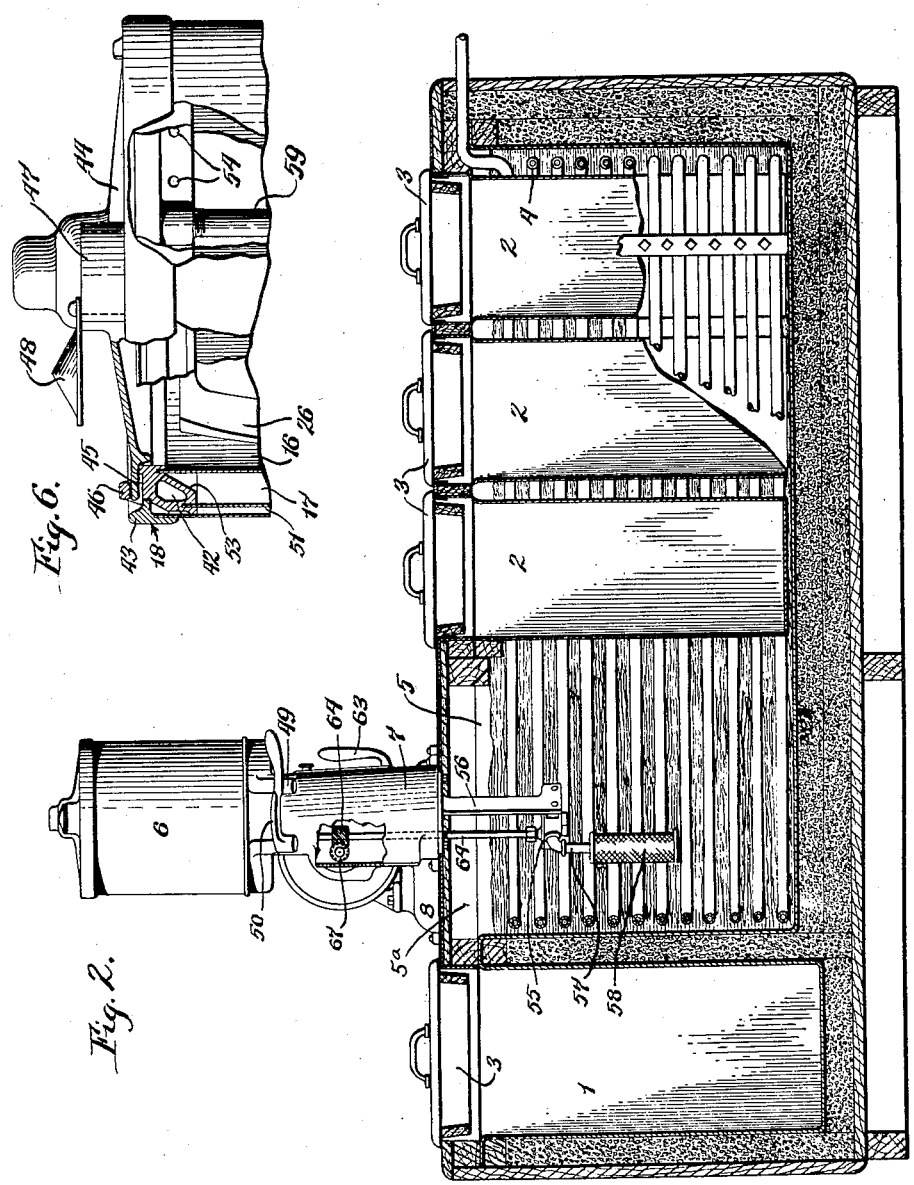
Inventor
Charles Taylor
By Popp and Powers.
Attorneys

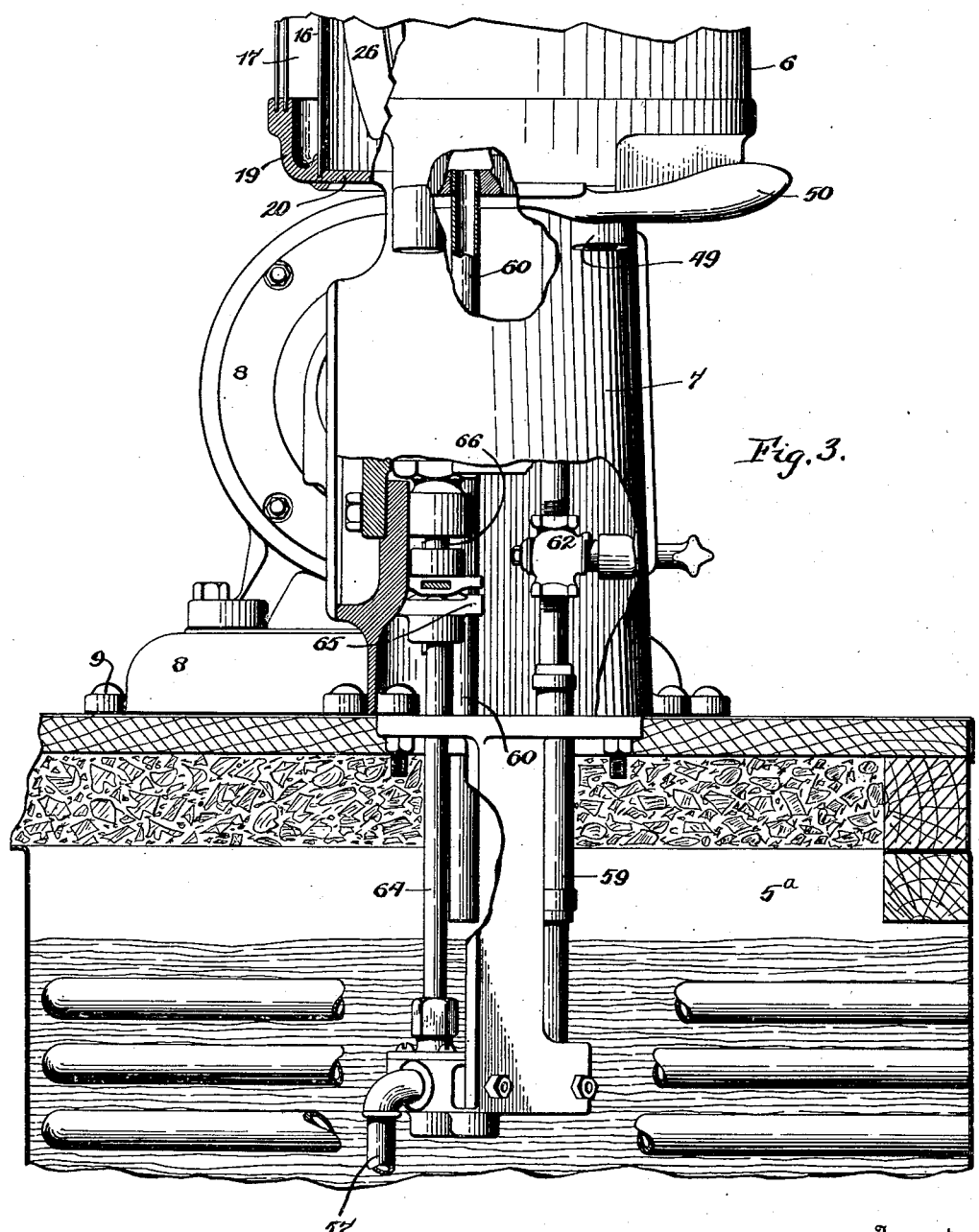

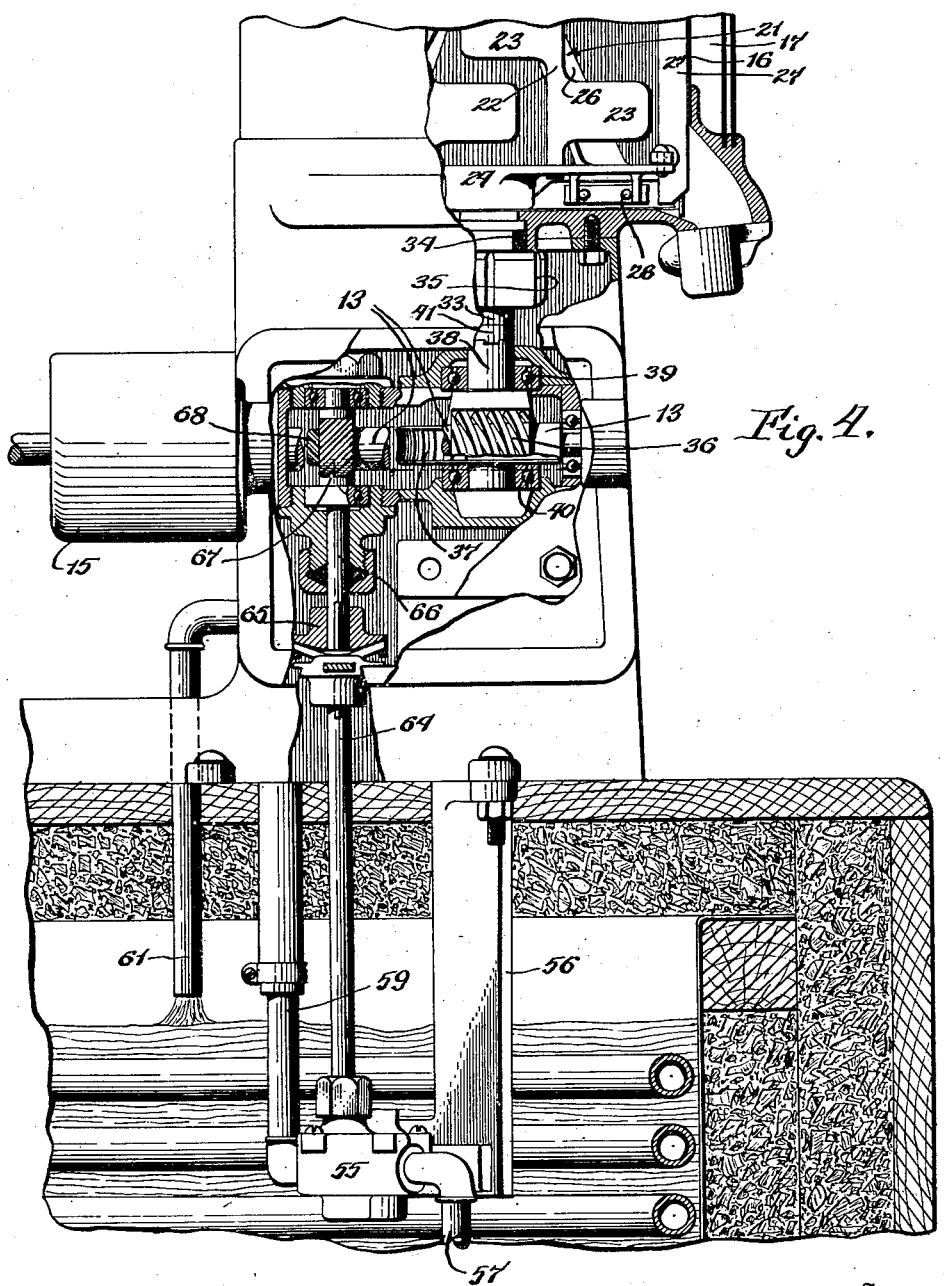

May 27, 1930. C. TAYLOR 1,760,217
ICE CREAM FREEZING SYSTEM
Filed Nov. 1, 1926 5 Sheets-Sheet 5
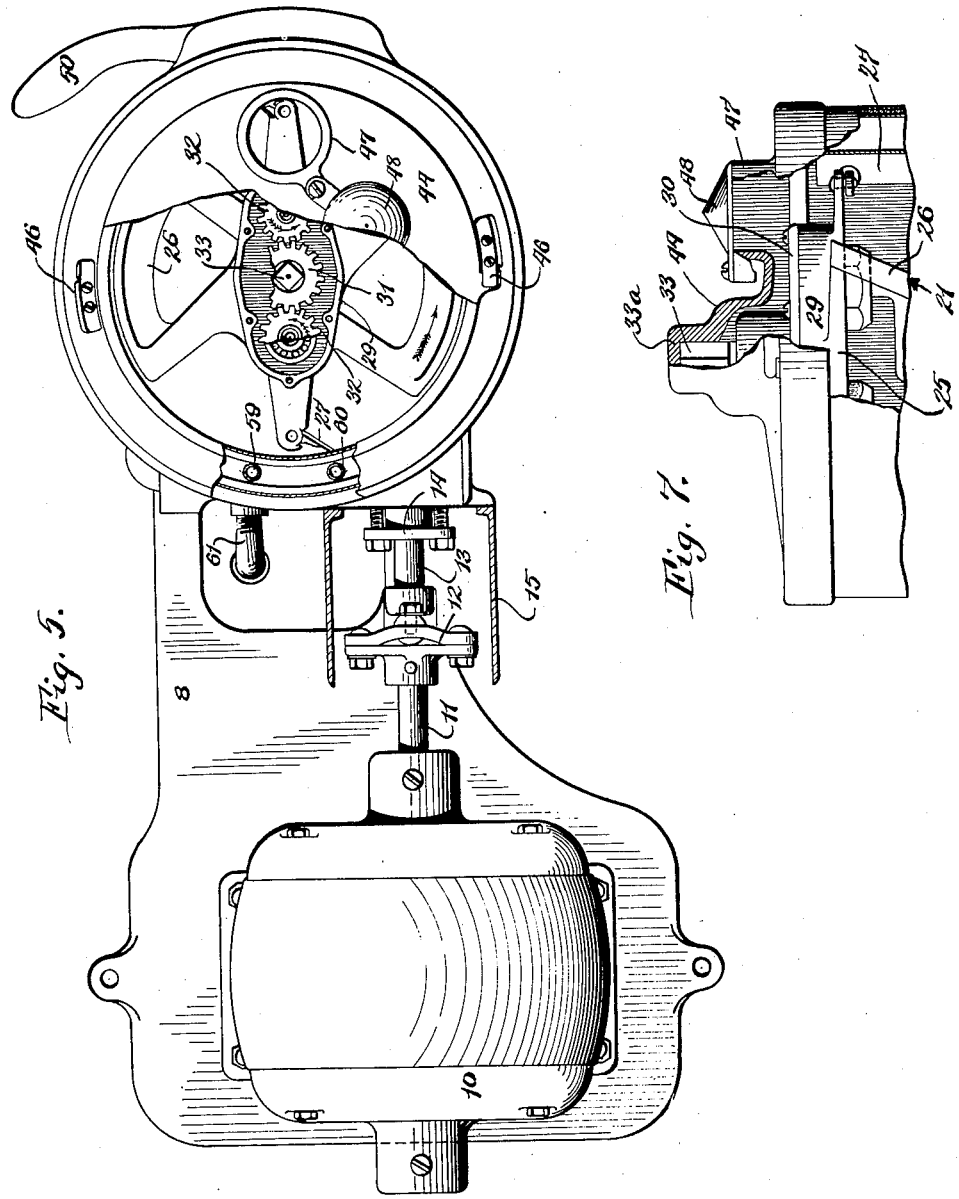
Inventor
Charles Taylor
By Popp and Powers.
Attorney Patented May 27, 1930

1,760,217

UNITED STATES PATENT OFFICE

CHARLES TAYLOR, OF BUFFALO, NEW YORK, ASSIGNOR TO TAYLOR FREEZER CORPORATION, OF BELOIT, WISCONSIN, A CORPORATION OF DELAWARE

ICE-CREAM-FREEZING SYSTEM REISSUED

Application filed November 1, 1926. Serial No. 145,426.

This invention relates to improvements in ice cream freezing systems and proposes an apparatus which is particularly adapted for use in retail establishments where the ice cream or similar frozen product is consumed at or shortly after the time of its purchase, i. e. stores, restaurants and road-side refreshment stands which have soda fountains or ice cream dispensing cabinets.

The manufacture of ice cream in retail establishments has been almost wholly abandoned for economic reasons. At the present time and for a number of years past ice cream which is sold at soda fountains and refreshment stands is made on a wholesale scale in large plants, each supplying a large number of dealers distributed throughout a considerable local territory such as a city and its outlying communities. Ice cream so made is furnished in cans, usually of five gallons capacity. As a rule several of these cans are purchased at a time and are stored back of the counter in ice boxes or refrigerator compartments; and as ice cream is called for by customers the clerk dips the ice cream from the cans which, when empty, are replaced by filled ones. Ice cream so dispensed, in addition to its period of storage at the manufacturing plant, may be kept for several days at the place where it is sold and is not comparable in respect to palatability and flavor with ice cream which is eaten shortly after it is frozen.

The principal object of the present invention to provide compact, unitary and relatively inexpensive equipment for use at the counters where ice cream is sold for the purpose of rapidly manufacturing ice cream in small quantities at such frequent intervals as may be required to furnish freshly frozen ice cream in accordance with the local retail demand and at a cost which enables it to be sold in competition with ice cream manufactured by wholesale establishments and for the further purpose of effectively meeting the psychological and physical requirements in connection with the retail merchandising of the product.

In the promotion of these purposes the invention consists of features of structure and combination pertaining to unitary cabinet and freezer equipment by which the ice cream mixture is pre-cooled, frozen, discharged in a semi-fluid state, and ripened and hardened, and in which the ice cream freezing element utilizing the refrigerating system common to all the other elements, is arranged at a point of easy accessibility with reference to the associated pre-cooling and ripening and hardening chambers, and is also arranged to operate in full view of the customer who thereby sees that the ice cream is made on the premises and under perfect sanitary conditions and is sold within a short time after its preparation. The equipment is also available for the manufacture and sale of ice cream in any form desired, i. e. in bulk, bricks, cups or molded shapes.

An embodiment of the invention is illustrated in the accompanying drawings in which:

Figure 1 is a plan view with parts broken away to show details of construction.

Figure 2 is a vertical longitudinal section with the freezer structure shown in elevation and with certain chamber walls partly broken away to show details of construction.

Figures 3 and 4 are enlarged partial elevations and vertical sections viewed from planes at right angles to one another and showing the freezer structure and associated cabinet structure, the view shown in Figure 3 conforming to that shown in Figure 2.

Figure 5 is a plan view, partly broken away, of the freezer structure and associated operating mechanism.

Figure 6 (Sheet 2) and Figure 7 (Sheet 5) are views from planes at right angles to one another, and with parts in section and parts in elevation, of the upper portion of the freezer structure.

The structure includes a cabinet which may be arranged in back of the counter in the usual manner or may be incorporated with the counter or work board and which is formed with a storage and pre-cooling chamber 1 for the ice cream mixture, and hardening and ripening chambers 2 for the necessary storage of the product, the several chambers being provided with removable lids 3.

The chambers 2 may be chilled in any suitable manner, that is to say by any suitable refrigerating system, the arrangement shown and preferred involving an expansion coil 4 for the circulation of the refrigerative medium and a body of brine which is cooled from the coil 4. The cabinet includes a brine reservoir 5 in which the chambers 2 are set. The coil 4 encircles the chambers 2 and extends adjacent the vertical walls of the brine container or reservoir 5 and the cabinet is constructed to provide passages adjacent the ends and between the walls of the chambers 2 through which the brine circulates by convection. The expansion coil 4 is suitably connected to the compressor (not shown) which has the usual automatic stop and start arrangement. The reservoir 5 is extended, as at 5ª, for some distance beyond the chambers 2 in order to provide ample space for the quantity of brine requisite for the purposes of the system, also to accommodate certain mechanical parts in co-operative relation to the freezer as will be hereafter described, and also to provide a large body of brine which will remain colder than the columns of brine adjacent the storage compartments thereby to promote circulation of the brine by convection.

The equipment also includes an ice cream freezer indicated generally at 6 which, together with its associated mechanism, is supported above the cabinet, preferably upon the top wall of the reservoir 5 and above the extension 5ª of said reservoir. The body of the ice cream freezer is supported by a hollow standard 7 which provides a housing for a number of the operating parts and which extends upright from a base or bed 8 suitably secured as by fastenings 9 to the top wall of the reservoir 5. The power for the operation of the ice cream freezer is preferably furnished by an electric motor 10 secured at one end of the base 8 and having a projecting shaft 11 connected by a suitable flexible coupling 12 to the main drive shaft 13 which enters the casing 7 through a suitable stuffing box 14. The coupling 12 and the projecting part of the shaft 13 are preferably enclosed in a guard casing 15 attached to the standard 7.

The ice cream freezer 6 may be of any suitable construction which is coordinated to, and therefore utilizes, the refrigerating system of the cabinet. As shown and preferred the freezer utilizes brine from the reservoir 5 for freezing the ice cream to the desired consistency. It therefore includes in addition to the freezing chamber 16, an outer chamber 17 for the circulation of the brine in a manner to be hereafter explained. The annular walls of the chambers 16 and 17 are secured to an upper head indicated generally at 18 (Figure 6) and a base 19 which provides the bottom 20 of the freezing chamber 16.

The freezer structure is illustrated in Figures 3 to 7 in a preferred form which is the subject of a companion application. Such structure includes a rotating dasher of suitable form which is indicated generally at 21 and beater shafts 22 which have operating arms 23. The dasher 21 comprises a lower head 24, an upper head 25 and spirally arranged dasher bars 26 extending between and secured to said heads. The heads 24 and 25 also support pivotally mounted scrapers 27 which operate against the cylindrical wall of the freezing chamber 16 and the head 24 supports a horizontal scraper 28 which operates against the bottom of said chamber. The beater shafts 22 are journaled in the heads 24 and 25 and during their movement with the dasher are also rotated by the dasher about their axial centers through gearing which is preferably of the construction shown. Thus the head 25 is formed to provide the vertical walls of a gear casing 29 which is completed by a cap plate 30 and encloses a stationary central pinion 31 and two pinions 32 arranged at opposite sides of the central pinion. The pinion 31 is mounted fast on a fixed arbor 33 which extends through an opening in the cap plate 30 and the pinions 32 are mounted fast on the upper ends of the beater shafts 22. As the head 25 rotates, carrying the beater shafts with it, the pinions 32 are driven by the fixed pinion 31 about which they revolve and by their rotation drive the beater shafts.

The lower head 24 is keyed or otherwise made fast to the dasher drive shaft 33 which is journaled in the freezer bottom wall 20 and projects into the standard 7, a suitable stuffing box 34 and gland nut 35 being provided to prevent leakage of the ice cream mixture past said shaft. The gearing for driving the dasher drive shaft 33 comprises a worm 36 mounted on the main drive shaft 13, a worm wheel 37 driven by the worm 36 and a worm wheel shaft 38 having suitable bearings at 39 and 40 in supporting parts which are mounted within the standard 7. The worm wheel shaft 38 is connected by any suitable direct coupling 41 to the dasher drive shaft 33.

The upper head 18 of the freezer includes a hollow brine distributing ring 42 and a retaining ring 43 encircling the ring 42. The freezer chamber 16 is closed at its top by a cover 44 which is supported on the ring 42 and is provided with marginal projections 45 for cooperation with over-hanging clamping lugs 46 carried by the ring 42. A slight turn of the cover 44 disengages the projections 45 from the lugs 46 and permits the cover to be lifted from the freezer. The cover is formed with a central socket 33ª (Figure 7) in which the square end of the arbor 33 has a conforming fit, the arbor being thereby held against rotation. The cover 44 is provided with a filling nipple 47 which is normally closed by a pivoted cap 48 and through which the ice cream mixture is introduced into the freezing chamber 16. At its lower end the freezer is provided with a discharge spout 49 which is normally closed by a suitable gate valve 50 and through which the partly frozen mixture is discharged in a semi-fluid state.

The freezer is constructed with a suitably insulated outer wall 51 which provides the above mentioned brine chamber 17 in surrounding relation to the freezing chamber 16. The ring 42 closes the brine chamber 17 at its upper end and is formed with a bottom wall 53 which is inclined downward away from the wall of the chamber 16 and is provided with a suitable number of regularly arranged brine discharge apertures 54 through which the brine issues in jets so directed as to impinge against the wall of the chamber 16 near the top thereof, the brine thence flowing downward along the wall of the chamber 16 and withdrawing heat from said chamber.

The brine is supplied to the ring 42 from the reservoir 5 by means of a brine pump 55 of any suitable construction and arrangement. The pump is sufficiently shown by the illustration of its casing and may be supported within the brine reservoir by a hanger bar 56 depending from the bottom of the standard 7. The intake 57 preferably carries a screen 58 and extends downward to a suitable point in the brine reservoir. The pump is connected to the ring 42 by a pipe 59 (Figures 3 and 4) which extends through the standard 7 and the freezer brine chamber 17 and the brine from said chamber is returned to the reservoir 5 by a pipe 60 (Figure 3) which extends through the standard 7 and has a discharge capacity conforming to that of the ring 42.

In order that the mechanism of the freezer may be operated independently of the refrigerating system the pipe 59 is connected to a brine return pipe 61 (Figures 3 and 5) which diverts the brine from the freezer and discharges it into the reservoir 5, the connection between the pipes 59 and 61 being controlled by a suitable three-way valve 62 having an externally accessible operating handle 63.

The pump drive shaft 64 is directly connected by a suitable flexible coupling 65 to an operating shaft 66 suitably mounted in the standard 7 and in turn driven by spiral gears 67 and 68 from the main drive shaft 13.

The equipment is used in the following manner: A suitable vessel containing the ice cream mixture is stored in the chamber 1 until a freezing is required. The mixture is then poured into the freezing chamber 16 through the nipple 47 after which the cap 48 is closed and the motor is started to cause the operation of the freezer mechanism, the valve 62 being operated at such time to connect the pump 55 and sprinkler ring 42 whereby the brine will be discharged against the wall of the chamber 16 in the manner and with the effect described, the brine being returned to the reservoir by the drain pipe 60. The operation of the freezer mechanism in connection with the discharge of brine from the ring 42 is continued until the mixture has been frozen to a semi-fluid consistency whereupon the valve 62 is operated to disconnect the ring 42 from the pump and to cause the brine to return to the reservoir through the by-pass 61. The brine already in the chamber 17 of the freezer quickly drains back into the reservoir through the pipe 60. The freezer mechanism is then continued in operation without any refrigerating effect for the purpose of whipping up the mixture and improving its flavor and texture. When this has progressed to the extent desired the gate valve 50 is opened to permit the discharge of the mixture through the spout 49 into a suitable vessel, such discharge being aided by the rotating bottom scraper 28. The vessel into which the frozen mixture is discharged is then placed in any one of the chambers 2 in which the mixture is hardened by the refrigerating effect of the brine which circulates about the walls of such chamber. From the spout 49 the mixture may be discharged into cans or into block molds, special molds or cups. If the ice cream is to be sold in bulk the cans may be removed from the chambers 2 to a dispensing cabinet after the mixture has been sufficiently hardened. If desired, however, one or more of the chambers 2 may be set aside for dispensing purposes and the ice cream may be dispensed directly from such chambers. This is preferred where the ice cream is to be sold in blocks; but where it is sold in bulk, due to the frequency of the calls for such products as sundaes, cones and the like and also to the time required in packing a measured charge such as a quart or pint the use of a separate dispensing cabinet is preferred in order to avoid refrigerating losses.

When the required quantity has been frozen the motor is stopped and another supply of ice cream mixture is placed in the chamber 1 in readiness for the next operation of the freezer.

It should be understood that where the word "brine" is used in the specification and in the claims it is used for the sake of brevity and it is not intended to thereby exclude the understanding that other non-freezing liquids and fluids suitable for refrigerating purposes may be used in place of the brine. Also the term "ice cream" is frequently employed in the specification and claims but it should be understood that the term is illustrative only and selected for the sake of brevity and does not exclude the understanding that other freezable foods may be frozen in like manner by this apparatus and operated upon in the same manner as is the ice cream.

Having fully described my invention, I claim:

1. An ice cream freezing system comprising a cabinet including a brine container, means for cooling the brine in said container, a freezer mounted on said cabinet above the level of the brine in said container, means for delivering brine from said container to said freezer, means for shutting off the flow of brine to the freezer, and means for draining the brine from said freezer back into said container.

2. An ice cream freezing system comprising a cabinet, a cooling medium container therein, an ice cream freezer mounted on said cabinet above the level of said container, means for conducting cooling medium from said container to said freezer, means for shutting off at will the supply of cooling medium to said freezer and means for returning all of the cooling medium from said freezer to said container.

3. An ice cream freezing system comprising a storage cabinet, an ice cream freezer including a cream chamber and a cooling chamber, disposed above the top of said cabinet, means for discharging the contents of the cream chamber from the bottom thereof, means for delivering cooling medium from said cabinet into the top of the cooling chamber, manually-controlled means for interrupting the delivery of cooling medium to said cooling chamber and means for returning said medium from the bottom of the cooling chamber to said cabinet.

4. An ice cream freezing system comprising a storage cabinet, an ice cream freezer including a cream chamber and a cooling chamber, disposed above the top of said cabinet, means for discharging the contents of the cream chamber from the bottom thereof, means for delivering cooling medium from said cabinet into the top of the cooling chamber, and means for returning said medium from the bottom of the cooling chamber to said cabinet.

5. An ice cream freezing system comprising a cabinet provided with a brine reservoir and storage compartments within said reservoir, means for cooling the brine in the reservoir, an ice cream freezer mounted above the cabinet and having a brine chamber surrounding a cream chamber, the cream chamber having a top filling opening and a bottom valve-controlled discharge opening, a pump and conduit for transferring brine from the reservoir to the brine chamber, a brine return pipe leading from the bottom of the brine chamber to said reservoir, a by-pass return from said conduit to the reservoir and a manually-operated valve for establishing communication between said pump and the brine chamber or said by-pass return.

6. An ice cream freezing system comprising a cabinet including a brine container and storage compartments disposed within said container and surrounded by the brine in the container, means for cooling said brine, a freezer mounted on said cabinet above the level of the brine in said container, means for delivering brine from the container to said freezer, means connected with the bottom of the freezer for returning the brine from said freezer to the container, and means for controlling the flow of brine to the freezer.

In testimony whereof I affix my signature.

CHARLES TAYLOR.